(12) United States Patent
Carlstedt et al.

(10) Patent No.: US 6,854,750 B2
(45) Date of Patent: Feb. 15, 2005

(54) VARIABLE RATE BUSHING FOR STABILIZER BAR

(75) Inventors: Robert P. Carlstedt, Rochester Hills, MI (US); James B. Chamberlin, Charlotte, NC (US); Ragnar H. Ledesma, Sterling Heights, MI (US); Nancy L. Saxon, Oakland Township, MI (US); Dennis A. Kramer, Troy, MI (US); Doyle R. Downey, Beverly Hills, MI (US); Joseph Cubalchini, St. Charles, IL (US); Monte G. Williams, Royal Oak, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 89 days.

(21) Appl. No.: 10/020,429

(22) Filed: Dec. 14, 2001

(65) Prior Publication Data

US 2003/0111818 A1 Jun. 19, 2003

(51) Int. Cl.$^7$ .............................................. B60G 11/44
(52) U.S. Cl. ........................ 280/124.169; 280/124.107; 267/276; 267/279
(58) Field of Search .................. 280/124.169, 124.166, 280/124.167, 124.106, 124.149, 124.152, 5.516, 124.107; 267/276, 277, 140.3, 141, 141.1, 279, 281

(56) References Cited

U.S. PATENT DOCUMENTS

| | | | |
|---|---|---|---|
| 2,417,019 A | 3/1947 | Sherman | |
| 2,901,240 A | 8/1959 | Fikse | |
| 2,961,253 A | 11/1960 | Allison | |
| 3,254,902 A | 6/1966 | Vittone | |
| 3,269,747 A | 8/1966 | Forge | |
| 3,392,971 A | * 7/1968 | Herbenar et al. ........... 267/269 |
| 3,448,994 A | 6/1969 | King et al. | |
| 3,963,261 A | 6/1976 | Hiruma | |
| 4,113,278 A | 9/1978 | Rissberger | |
| 4,206,935 A | 6/1980 | Sheppard et al. | |
| 4,281,850 A | 8/1981 | Studer | |
| 4,589,678 A | 5/1986 | Lund | |
| 4,613,153 A | 9/1986 | Shibahata et al. | |
| 4,614,358 A | 9/1986 | Wymann | |
| 4,623,164 A | 11/1986 | Cassel et al. | |
| 4,648,620 A | 3/1987 | Nuss | |
| 4,664,408 A | 5/1987 | Saotome et al. | |
| 4,765,650 A | * 8/1988 | Kameshima et al. .. 280/124.116 |
| 4,796,911 A | 1/1989 | Kuroki et al. | |
| 4,805,929 A | 2/1989 | Shibata et al. | |
| 4,834,419 A | 5/1989 | Kozaki et al. | |
| 4,884,790 A | * 12/1989 | Castrilli ...................... 267/154 |
| 5,161,822 A | 11/1992 | Lund | |
| 5,178,406 A | 1/1993 | Reynolds | |
| 5,186,486 A | 2/1993 | Hynds et al. | |
| 5,217,245 A | 6/1993 | Guy | |
| 5,295,670 A | * 3/1994 | Tsukamoto et al. ....... 267/140.5 |
| 5,303,907 A | * 4/1994 | Holzheimer ................ 267/281 |
| 5,374,038 A | * 12/1994 | Hein ....................... 267/140.5 |

(List continued on next page.)

Primary Examiner—David R. Dunn
(74) Attorney, Agent, or Firm—Carlson, Gaskey & Olds

(57) ABSTRACT

A variable rate bushing passively controls the stiffness of a stabilizer bar. During normal vehicle operation, the stabilizer bar is compliant. As twist increase, the resistance increases. In one embodiment, the variable rate bushing includes at least one void which compresses as the vehicle turns. As the stabilizer bar axially twists, the void compresses and the rate of the bushing increases, reducing axial twist and increasing stiffness of the stabilizer bar. In one embodiment, the voids are teardrop shaped, arc shaped, or bone shaped. Alternatively, the bushing includes an inner layer of softer material and an outer layer of harder material to control stabilizer bar stiffness. Also, the bushing may include a molded insert made of a hard material inserted into a softer material to control the stiffness of the stabilizer bar.

5 Claims, 4 Drawing Sheets

U.S. PATENT DOCUMENTS

| | | | |
|---|---|---|---|
| 5,382,007 A | * 1/1995 | Holzheimer | ................ 267/154 |
| 5,447,325 A | 9/1995 | DePue et al. | |
| 5,505,480 A | 4/1996 | Pascarella | |
| 5,687,960 A | 11/1997 | Moon | |
| 5,882,017 A | 3/1999 | Carleer | |
| 6,022,030 A | 2/2000 | Fehring | |
| 6,022,034 A | 2/2000 | Santo et al. | |
| 6,145,858 A | * 11/2000 | Foulquier | .............. 280/124.13 |
| 6,149,166 A | 11/2000 | Struss et al. | |
| 6,161,843 A | 12/2000 | Carleer | |
| 6,419,214 B2 | * 7/2002 | Palinkas | .................... 267/141 |
| 6,474,631 B2 | * 11/2002 | Hadano et al. | ............. 267/276 |

* cited by examiner

VARIABLE RATE BUSHING FOR STABILIZER BAR

BACKGROUND OF THE INVENTION

The present invention relates generally to a variable rate bushing utilized on a vehicle stabilizer bar of a vehicle suspension system which passively interacts with the stabilizer bar to minimize vehicle roll.

Vehicles are commonly equipped with suspension systems for absorbing road shock and other vibrations, while providing for a smooth and comfortable ride. A suspension component, such as a stabilizer bar, is often used to increase roll rigidity and improve the steering stability of the vehicle. The stabilizer bar is generally attached to the lower A-arms of the suspension system and controls sway as the vehicle turns and provides a pull down force during cornering. This is especially important in sports utility vehicles, which have a higher tendency to roll when the driver attempts an emergency maneuver due to the high center of gravity.

As a vehicle turns, the body of the vehicle rolls to the outside of the turn. The suspension components on the outside of the turn are generally compressed, while the suspension components on the inside of the turn are generally extended. The stabilizer bar counters this motion by pushing up on the suspension components collapsed and compressing the suspension components expanded through torsion in the stabilizer bar.

During cornering, it is desirable that the stiffness of the stabilizer bar be increased. If the stabilizer bar is too compliant, the vehicle will not respond well during cornering, increasing the likelihood of rolling over. However if the stabilizer bar is too stiff, the ride and handling will be compromised during normal vehicle operation. Therefore, it is desirable that the stiffness of the stabilizer bar be variable to adjust for changing driving conditions.

In a proposed vehicle suspension system, a pair of selectively activated variable clamping devices clamp the stabilizer bar to the vehicle body. When a roll sensor detects vehicle roll above a predetermined threshold, a solenoid valve actuates at least one of the clamping devices to provide a clamping force on the stabilizer bar, varying the torsional length of the stabilizer bar. In this prior system, the clamping force is provided by fluid which flows into chambers in the clamping device. As the flow of fluid increases, the clamping force increases to stiffen the stabilizer bar.

In another prior stabilizer bar system, the bar contacts a frame stop after a limited amount of movement. Once the bar contacts the stop, roll stiffness increases dramatically.

SUMMARY OF THE INVENTION

This invention relates to a variable rate bushing utilized on a stabilizer bar of a vehicle suspension system to minimize vehicle roll.

A variable rate bushing is positioned on a stabilizer bar to passively control the rate and stiffness of the stabilizer bar. In one embodiment, the bushing includes at least one void extending along the length of the bushing. In preferred embodiments, the void may be teardrop shaped, arc shaped, or bone shaped. During normal vehicle operation, the void is fully expanded, and the stabilizer bar is compliant. When the vehicle turns and the stabilizer bar axially twists, the voids are compressed by the stabilizer bar, increasing the stiffness rate of the bushing. When the voids are fully compressed, opposing edges of the voids contact, reducing axial twist of the stabilizer bar. The stiffness of the stabilizer bar increases, reducing the chance of rollover.

In a second embodiment, the bushing includes an inner layer of softer material proximate to the stabilizer bar and a surrounding outer layer of harder material. During turning when the stabilizer bar begins to axially twist, the stabilizer bar first compresses the softer material and is more compliant. As the stabilizer bar continues to twist, the stabilizer bar eventually presses into the harder material of the bushing, stiffening the stabilizer bar and preventing rollover.

In a third embodiment, a molded insert is positioned in the bushing. The insert is preferably made of metal or Kevlar. As the vehicle turns, the stabilizer bar presses into the insert, reducing axial twist and increasing the stiffness of the stabilizer bar.

Accordingly, the present invention provides a variable rate bushing utilized on a stabilizer bar of a vehicle suspension system to minimize vehicle roll.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
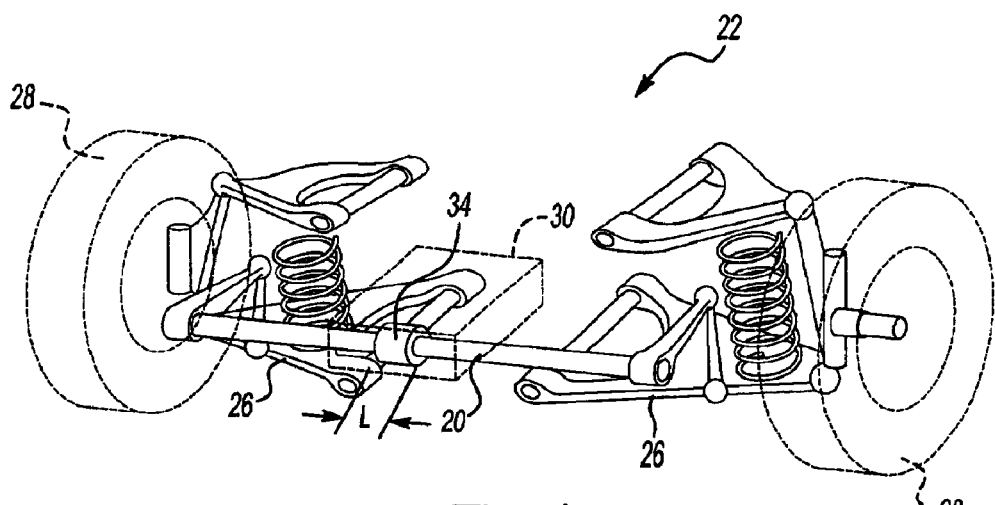
FIG. 1 illustrates a front schematic view of a vehicle suspension system including a stabilizer bar employing a variable rate bushing of the present invention.

FIG. 1 illustrates a stabilizer bar 20 of a vehicle suspension system 22. As shown, the stabilizer bar 20, or anti-roll bar or anti-sway bar, is attached to control arms 26 which are connected to wheels 28. A variable rate bushing 34 is positioned on the stabilizer bar 20. The stabilizer bar 20 is attached to the vehicle body 30, shown schematically, by a mounting bracket 32 (shown in FIG. 2A) which is positioned over the bushing 34. Although two bushings 34 are illustrated, a worker skilled in the art would recognize that this invention extends to mounts employing more or less bushings 34.

Figure 2A:
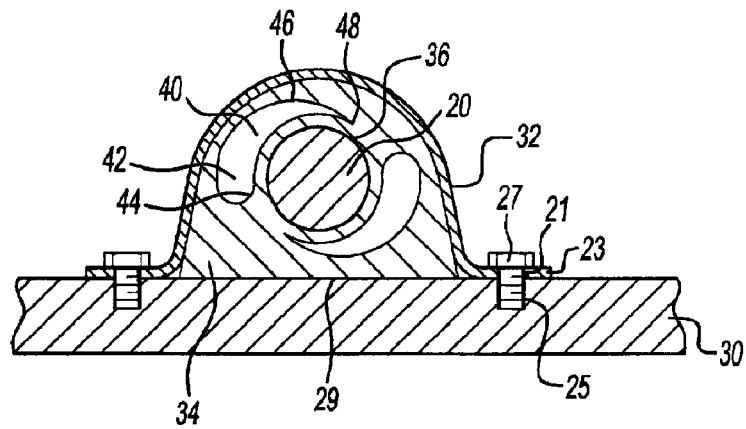
FIG. 2A illustrates a cross-sectional view of a first embodiment of the variable rate bushing of the present invention employing tear drop shaped voids.

The variable rate bushing 34 of the present invention passively controls the rate and stiffness of the stabilizer bar 20. As shown in FIG. 2A, the bushing 34 is preferably substantially cylindrical in shape and preferably made of rubber or other resilient material. The bushing 34 includes an aperture 36 through which the stabilizer bar 20 passes. When the mounting bracket 32 is positioned over the bushing 34 to secure the stabilizer bar 20 to the vehicle body 30, the lower surface 29 of the bushing 34 is slightly flattened and presses against the body 30. Preferably, the bracket 32 further includes a hole 21 in each of the bracket arms 23 which align with a corresponding hole 25 in the body 30. An attachment member 27, such as a bolt, passes through the aligned holes 21 and 25 to secure the mounting bracket 32 to the body 30. However, other methods of attachment are possible, and one skilled in the art would know how to attach the mounting bracket 32 to the body 30.

Figure 2B:
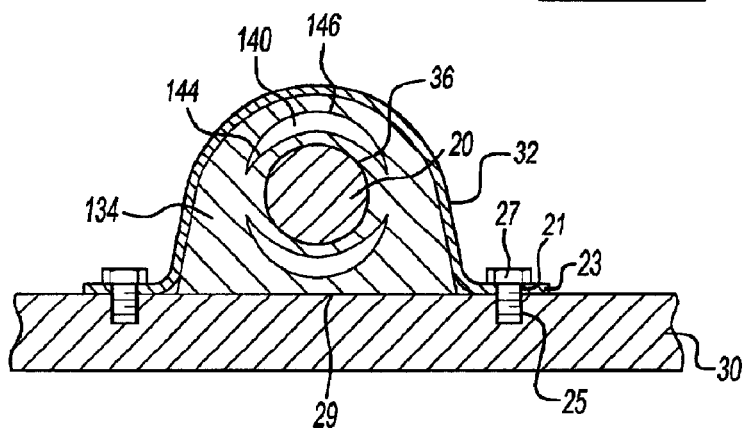
FIG. 2B illustrates a cross-sectional view of a first embodiment of the variable rate bushing of the present invention employing an arc shaped void.
Figure 2C:
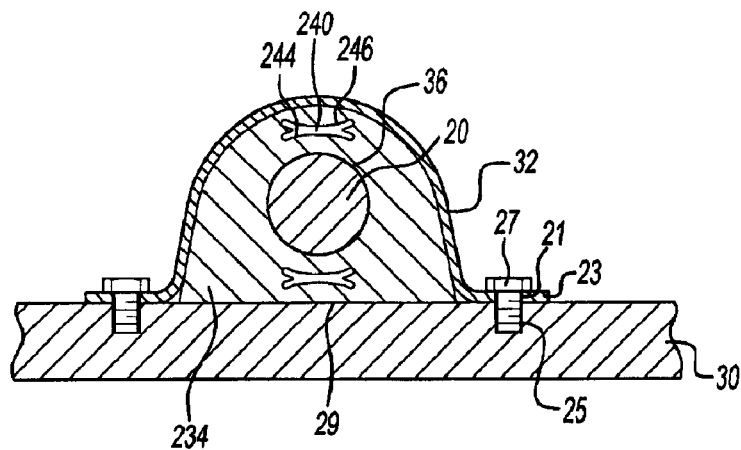
FIG. 2C illustrates a cross-sectional view of a first embodiment of the variable rate bushing of the present invention employing a bone shaped void.
Figure 2D:
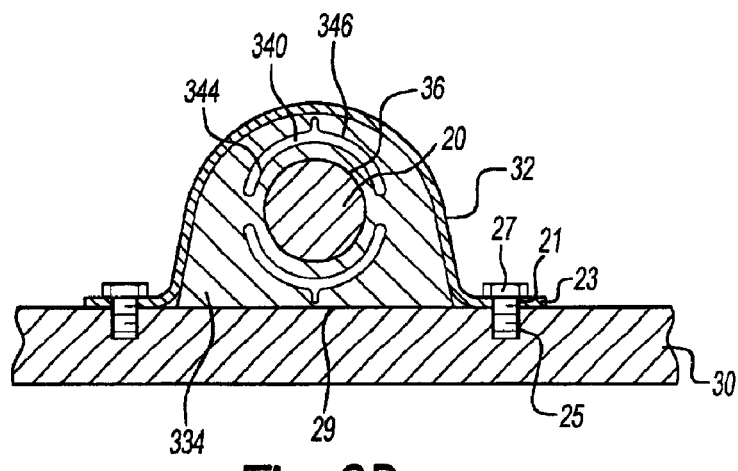
FIG. 2D illustrates a cross-sectional view of a first embodiment of the variable rate bushing of the present invention employing a wishbone shaped void.

FIG. 2A shows a first embodiment of the variable rate busing 34 including a pair of tear drop shaped voids 40. The voids 40 preferably extend through the entire length L (shown in FIG. 1) of the bushing 34. Each void 40 includes an inner surface 44 equally spaced from the aperture 36 and an outer surface 46. The outer surface 46 is closer to the inner surface 44 at the tapered portion 48 of the void 40, and is relatively farther away from the inner surface 44 at the enlarged portion 42 of the void 40. An alternative bushing 134 has voids 140 which are arc shaped as shown in FIG. 2B. Another alternative 234 has voids 240 which are bone shaped, as illustrated in FIG. 2C. Another embodiment 334 has voids 340 which are wishbone shaped, as shown in FIG. 2D. Although four shapes for the voids 40, 140, 240 and 340 have been described and illustrated, one skilled in the art would understand that other shapes are possible.

Returning to FIG. 2A, during normal vehicle operation, the voids 40 are fully expanded and the bushing 34 has a low rate. The stabilizer bar 20 is compliant, allowing for a smooth and comfortable ride. As the vehicle turns, the stabilizer bar 20 axially twists and slightly translates to resist vehicle roll. At the beginning of the twist, the stabilizer bar 20 begins to press into the enlarged portion 42 of the void 40. As the void 40 is large at the enlarged portion 42, the inner surface 44 and the outer surface 46 of the void 40 do not contact.

Figure 3A:
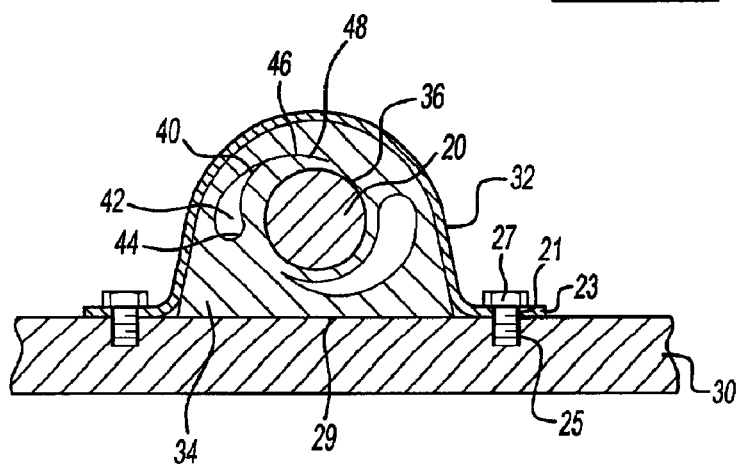
FIG. 3A illustrates a cross-sectional view of a first embodiment of the variable rate bushing of the present invention when the tear dropped shaped voids are compressed.

As the stabilizer bar 20 continues to axially twist and slightly translate, the stabilizer bar 20 presses along the inner surface 44 of void 40, and the stiffness of the stabilizer bar 20 increases. Eventually, the stabilizer bar 20 presses onto the inner surface 44 of the void 40 proximate to the tapered portion 48. As the inner surface 44 and the outer surface 46 are proximate to each other at the tapered portion 48, the void 40 at the tapered portion 48 may collapse, as shown in FIG. 3A. Once the inner surface 44 and the outer surface 46 contact, the rate of the bushing 34 becomes high, and further axial twist of the stabilizer bar 20 is reduced, increasing the stiffness of the stabilizer bar 20. The vehicle is less prone to rollover because the vehicle does not lean further during cornering.

The voids 40 are preferably located in the bushing 34 such that when the stabilizer bar 20 beings to twist, the stabilizer bar 20 first presses into the enlarged portion 42. Eventually, the stabilizer bar 20 will twist such that the stabilizer bar 20 presses into the tapered portion 48, increasing the stiffness of the stabilizer bar 20. One skilled in the art would know the proper placement of the voids 40.

Figure 3B:
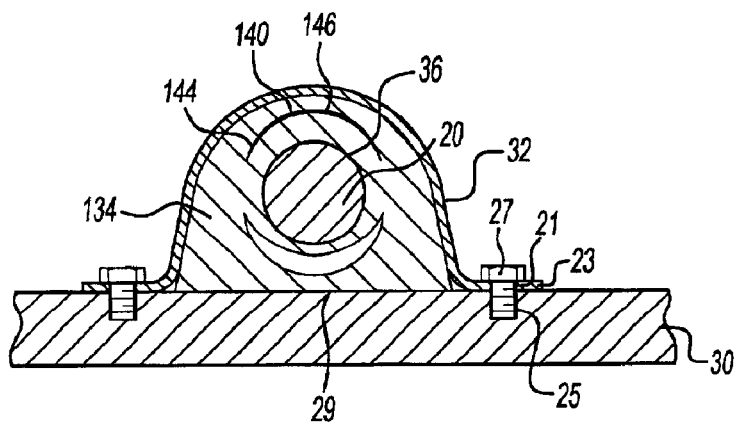
FIG. 3B illustrates a cross-sectional view of a first embodiment of the variable rate bushing of the present invention when the arc shaped void is compressed.
Figure 3C:
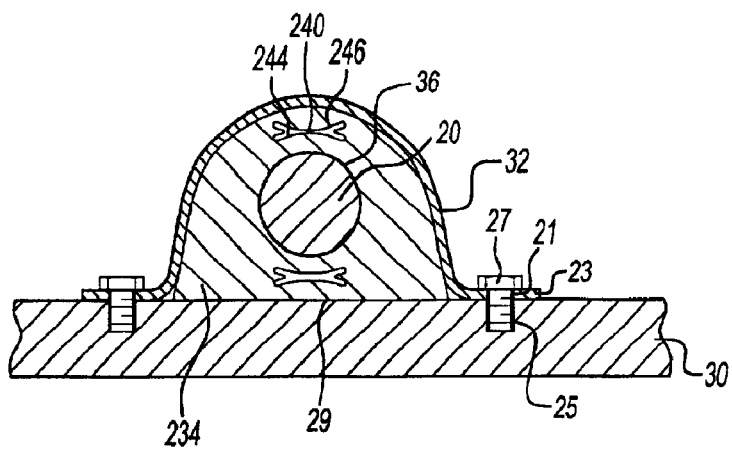
FIG. 3C illustrates a cross-sectional view of a first embodiment of the variable rate bushing of the present invention when the bone shaped void is compressed.
Figure 3D:
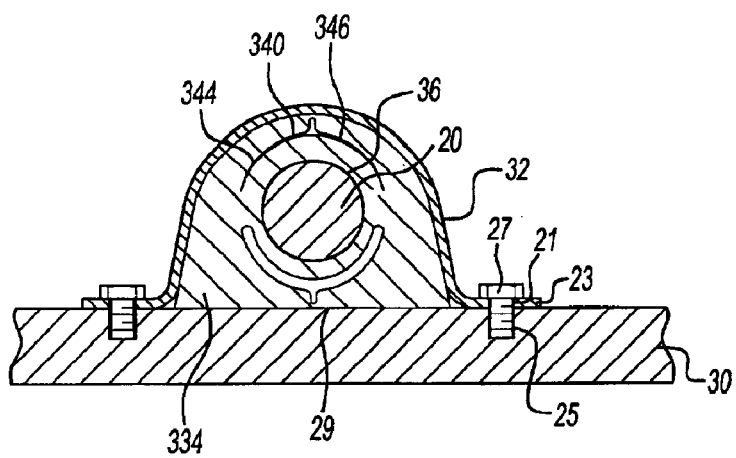
FIG. 3D illustrates a cross-sectional view of a first embodiment of the variable rate bushing of the present invention when the wish bone shaped void is compressed.

FIG. 3B shows the bushing 134 of FIG. 2B employing an arc shaped void 134 compressed by the stabilizer bar 20. When the stabilizer bar 20 twists and presses against the inner surface 144 of the void 140, the void 140 compresses. The inner surface 144 contacts the outer surface 146 of the bushing 134, compressing the void 140 and providing for additional stiffness in the stabilizer bar 20. FIG. 3C shows the bushing 234 employing bone shaped voids 240. When compressed, the inner surface 244 of the void 240 contacts the outer surface 246, increasing the stiffness of the stabilizer bar 20. FIG. 4D shows the bushing 334 employing wish bone shaped voids 340. When compressed, the inner surface 344 of the void 340 contacts the outer surface 346, increasing the stiffness of the stabilizer bar 20.

Figure 4:
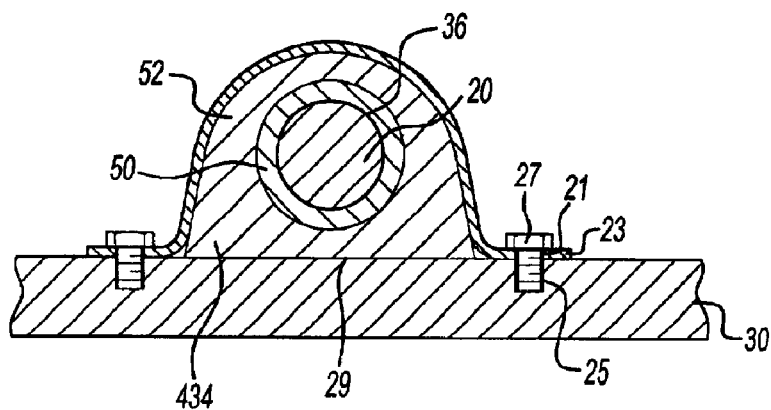
FIG. 4 illustrates a cross-sectional view of a second embodiment of the variable rate bushing of the present invention employing an inner layer of softer material and an outer layer of harder material.

A second type of the bushing 434 is shown in FIG. 4. The bushing 434 includes an inner layer of softer material 50 and an outer layer of harder material 52. During normal vehicle operation, the bushing 434 has a low rate and the stabilizer bar 20 is compliant. When the stabilizer bar 20 begins to axially twist, the stabilizer bar 20 first presses into the inner layer of softer material 50. As the stabilizer bar 20 continues to axially twist and slightly translate, the stabilizer bar 20 presses into the outer layer of harder material 52. When the stabilizer bar 20 presses into the outer layer of harder material 52, the bushing 434 has a high rate and axial twist of the stabilizer bar 20 is reduced, stiffening the stabilizer bar 20 and preventing vehicle roll.

Figure 5:
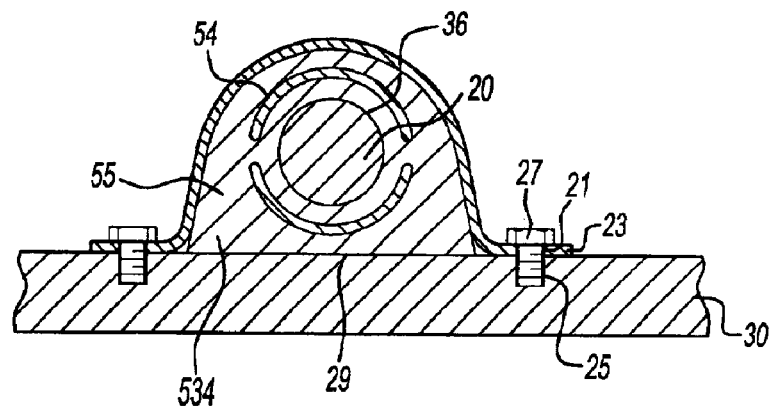
FIG. 5 illustrates a cross-sectional view of a third embodiment of the variable rate bushing of the present invention employing an additional molded insert.

A third type of the bushing 534, as shown in FIG. 5, includes at least one molded insert 54 made of a harder material, such as metal or Kevlar, in surrounding softer material 55. When the vehicle turns and the stabilizer bar 20 begins to axially twist in response to the turn, the stabilizer bar 20 presses into the softer material 55. Eventually, with further twist, the stabilizer bar 20 presses against the harder insert 54. The pressure of the stabilizer bar 20 on the insert 54 reduces axial twist of the stabilizer bar 20, increasing the rate of the bushing 534 and stiffening the stabilizer bar 20.

The bushing can also include different combinations of voids 40, layers 50 and 52, and inserts 54. For example, the bushing 34 can include a teardrop shaped void 40 and an insert 54, or an arc shaped void 140 positioned in a bushing 34 including a layer of softer material 50 and a layer of harder material 52. One skilled in the art would know what combinations to use, as well as the placement of the voids 40, layers 50 and 52, and inserts 54.

There are several advantages to utilizing the variable rate bushings 34, 134, 234, 334, 434, and 534 of the present invention on a stabilizer bar 20. For one, the stiffness and the rate of the stabilizer bar 20 can be continually passively modified according to ride conditions. During normal vehicle operations, the stabilizer bar 20 is compliant, allowing for a smooth and comfortable ride. When the vehicle turns and the stabilizer bar 20 axially twists, the stabilizer bar 20 interacts with a variable rate bushing positioned about the stabilizer bar 20 to modify the stiffness of the bar 20. The chance of vehicle roll is reduced, especially in sports utility vehicles. The stabilizer bar 20 provides additional roll stabilization during extreme maneuvers and roll over conditions. The stabilizer bar 20 can have low compliance for normal driving, and a high compliance for cornering.

Accordingly, the present invention provides a variable rate bushing utilized on a stabilizer bar of a vehicle suspension system to minimize vehicle roll.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A vehicle suspension system comprising:
   a stabilizer bar for a vehicle wheel;
   at least one bushing positioned about said stabilizer bar including at least one passive structure, said at least one passive structure for interacting with said stabilizer bar to vary a level of stiffness of said stabilizer bar; and
   said at least one passive structure having an outer layer of material positioned outwardly of an inner layer of material, said outer layer of material being substantially harder than said inner layer of material, said stabilizer bar for pressing into said outer layer of material as said stabilizer bar twists to increase said level of stiffness of said stabilizer bar.

2. The vehicle suspension system as recited in claim 1 wherein a mounting bracket is positioned over said at least one bushing for securing said stabilizer bar to a vehicle frame.

3. The vehicle suspension system as recited in claim 1 wherein said at least one bushing is made of rubber.

4. The vehicle suspension system as recited in claim 1 wherein said at least one passive structure extends along a length of said at least one bushing.

5. A vehicle suspension system comprising:
   a stabilizer bar connected to a vehicle wheel;
   a vehicle frame;
   at least one bushing made of rubber positioned about said stabilizer bar including at least one passive structure, said at least one passive structure extending along a length of said at least one bushing and for interacting with said stabilizer bar to vary a level of stiffness of said stabilizer bar, said stabilizer bar secured to said vehicle frame by a mounting bracket positioned over said at least one bushing; and
   said at least one passive structure having an outer layer of material positioned outwardly of an inner layer of material, said outer layer of material being substantially harder than said inner layer of material, said stabilizer bar for pressing into said outer layer of material as said stabilizer bar twists to increase said level of stiffness of said stabilizer bar.

* * * * *

UNITED STATES PATENT AND TRADEMARK OFFICE
CERTIFICATE OF CORRECTION

PATENT NO. : 6,854,750 B2
DATED : February 15, 2005
INVENTOR(S) : Carlstedt et al.

It is certified that error appears in the above-identified patent and that said Letters Patent is hereby corrected as shown below:

<u>Title page,</u>
Item [75], Inventors, "Joseph Cubalchini" should read -- Joseph Cubalchini, Jr. --

Signed and Sealed this

Twenty-fourth Day of May, 2005

JON W. DUDAS
*Director of the United States Patent and Trademark Office*